(12) United States Patent
Mori et al.

(10) Patent No.: US 10,224,796 B2
(45) Date of Patent: Mar. 5, 2019

(54) VIBRATION MOTOR AND MOBILE COMMUNICATION APPARATUS

(71) Applicant: Nidec Seimitsu Corporation, Ueda-shi, Nagano-ken (JP)

(72) Inventors: Zendi Mori, Ueda (JP); Takayuki Takeuchi, Ueda (JP)

(73) Assignee: NIDEC SEIMITSU CORPORATION, Nagano (JP)

( * ) Notice: Subject to any disclaimer, the term of this patent is extended or adjusted under 35 U.S.C. 154(b) by 423 days.

(21) Appl. No.: 15/200,073

(22) Filed: Jul. 1, 2016

(65) Prior Publication Data

US 2017/0005556 A1  Jan. 5, 2017

(30) Foreign Application Priority Data

Jul. 3, 2015  (JP) .................................. 2015-134266

(51) Int. Cl.
*H02K 1/34* (2006.01)
*H02K 33/18* (2006.01)
(Continued)

(52) U.S. Cl.
CPC .............. *H02K 33/18* (2013.01); *H02K 1/34* (2013.01); *H04M 1/026* (2013.01); *H04M 19/047* (2013.01)

(58) Field of Classification Search
CPC ......... H02K 1/34; H02K 33/18; H04M 1/725; H04M 2201/08
(Continued)

(56) References Cited

U.S. PATENT DOCUMENTS 8,519,573 B2 * 8/2013 Keisuke .................. B06B 1/045
                                                    310/15
8,742,634 B2 * 6/2014 Kim ........................ H02K 33/16
                                                    310/12.16
(Continued)

FOREIGN PATENT DOCUMENTS

JP       10-263476 A    10/1998
JP       2004-328805 A  11/2004
(Continued)

*Primary Examiner* — John K Kim
(74) *Attorney, Agent, or Firm* — Keating & Bennett, LLP

(57) ABSTRACT

A vibration motor includes a base portion arranged to extend perpendicularly to a central axis extending in a vertical direction; a magnet portion fixed above the base portion, and arranged to point in the vertical direction; a vibrating portion including a coil portion arranged radially opposite to the magnet portion, and arranged around the magnet portion to vibrate in the vertical direction; a cover portion arranged to cover upper and lateral sides of the magnet portion and the vibrating portion, and fixed to the base portion; an elastic member arranged around the magnet portion between an inner surface of an upper portion of the cover portion and an upper portion of the vibrating portion, and arranged to extend radially inward in a downward direction from the inner surface of the upper portion of the cover portion; at least one adhesive layer fixed to an upper surface of the vibrating portion, and arranged in a circumferential direction below the elastic member; and at least one viscous body in a paste, arranged in the circumferential direction on an upper surface of the at least one adhesive layer, arranged vertically opposite to the elastic member, and including an upper end portion arranged at a level higher than the level of the upper surface of the vibrating portion.

12 Claims, 12 Drawing Sheets

(51) Int. Cl.
  *H04M 1/725* (2006.01)
  *H04M 1/02* (2006.01)
  *H04M 19/04* (2006.01)

(58) Field of Classification Search
  USPC .......................................... 310/12.16, 15, 25
  See application file for complete search history.

(56) References Cited

U.S. PATENT DOCUMENTS

| | | | |
|---|---|---|---|
| 8,941,272 B2* | 1/2015 | Hong | H02K 33/18 310/15 |
| 2010/0052578 A1* | 3/2010 | Kim | B06B 1/045 318/114 |
| 2012/0169149 A1 | 7/2012 | Yoon et al. | |
| 2012/0319506 A1* | 12/2012 | Shim | B06B 1/045 310/25 |
| 2013/0088100 A1 | 4/2013 | Lee et al. | |
| 2013/0093266 A1* | 4/2013 | Hong | H02K 33/18 310/15 |
| 2014/0125151 A1* | 5/2014 | Furukawa | H02K 35/00 310/25 |
| 2017/0005556 A1* | 1/2017 | Mori | H02K 33/18 |
| 2017/0149320 A1* | 5/2017 | Mori | H02K 15/14 |

FOREIGN PATENT DOCUMENTS

| | | |
|---|---|---|
| JP | 2010-509065 A | 3/2010 |
| JP | 2013-85438 A | 5/2013 |

* cited by examiner

VIBRATION MOTOR AND MOBILE COMMUNICATION APPARATUS

BACKGROUND OF THE INVENTION

1. Field of the Invention

The present invention relates to a vibration motor and a mobile communication apparatus.

2. Description of the Related Art

In recent years, vibration motors that cause a vibrating portion to vibrate in a vertical direction through interaction between a coil and a magnet arranged in a radial direction have often been used as silent notification devices in mobile communication apparatuses or the like or for other purposes. In a vibration motor disclosed in US 2012/0169149, a damper 124 is arranged on an upper surface of a weight 122 arranged opposite to an elastic member 125. The damper 124 prevents the weight 122 from making direct contact with the elastic member 125. A reduction in noise caused by a direct contact between the weight 122 and the elastic member 125 is thus achieved.

The vibration motor disclosed in US 2012/0169149 includes the damper 124 as an additional component. Accordingly, the number of components of the vibration motor and the number of steps for assembling the vibration motor increase, and this may result in an increased production cost of the vibration motor. In a common vibration motor, the vibration frequency of a weight is set close to the natural vibration frequency of an elastic member to increase the amount of vibration of the vibration motor. The addition of the damper 124 as mentioned above may cause the vibration frequency of the elastic member 125 to deviate from the natural vibration frequency thereof due to a contact between the elastic member 125 and the damper 124, which may result in a reduction in the amount of vibration. In other words, the contact of the elastic member 125 with the damper 124 may increase unwanted frequency components other than the natural vibration frequency in the vibration of the elastic member 125, which may result in a reduction in the amount of vibration.

SUMMARY OF THE INVENTION

A vibration motor according to a preferred embodiment of the present invention includes a base portion arranged to extend perpendicularly to a central axis extending in a vertical direction; a magnet portion fixed above the base portion, and arranged to point in the vertical direction; a vibrating portion including a coil portion arranged radially opposite to the magnet portion, the vibrating portion being arranged around the magnet portion to vibrate in the vertical direction; a cover portion arranged to cover upper and lateral sides of the magnet portion and the vibrating portion, and fixed to the base portion; an elastic member arranged around the magnet portion between an inner surface of an upper portion of the cover portion and an upper portion of the vibrating portion, and arranged to extend radially inward in a downward direction from the inner surface of the upper portion of the cover portion; at least one adhesive layer fixed to an upper surface of the vibrating portion, and arranged in a circumferential direction below the elastic member; and at least one viscous body in a paste, the at least one viscous body being arranged in the circumferential direction on an upper surface of the at least one adhesive layer, arranged vertically opposite to the elastic member, and including an upper end portion arranged at a level higher than a level of the upper surface of the vibrating portion.

According to the above preferred embodiment of the present invention, the vibration frequency of the elastic member is stabilized to increase the amount of vibration of the vibration motor.

The above and other elements, features, steps, characteristics and advantages of the present invention will become more apparent from the following detailed description of the preferred embodiments with reference to the attached drawings.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 3:
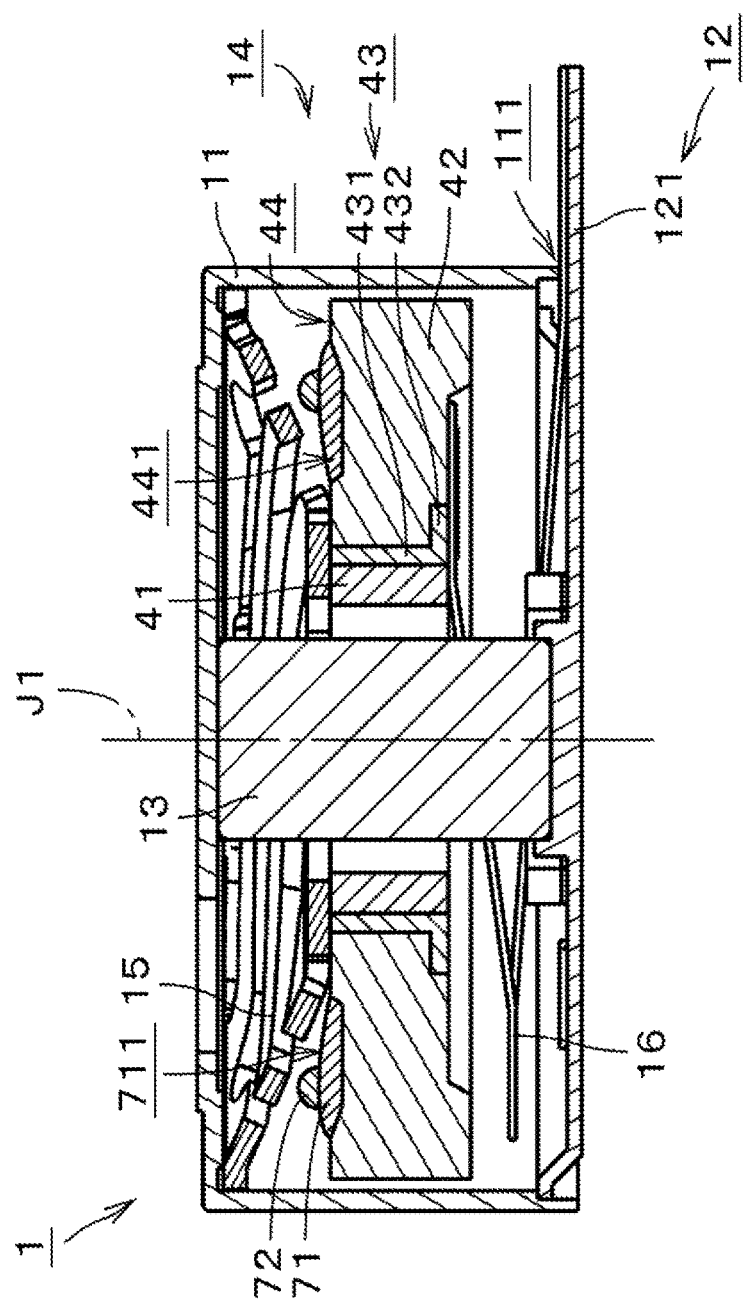
FIG. 3 is a vertical sectional view of the vibration motor.

It is assumed herein that a vertical direction is defined as a direction in which a central axis J1 of a vibration motor 1 extends, and that an upper side and a lower side along the central axis J1 in FIG. 3 are referred to simply as an upper side and a lower side, respectively. It should be noted, however, that the above definitions of the vertical direction and the upper and lower sides are not meant to indicate relative positions or directions of different members or portions when those members or portions are actually installed in a device. Also note that a direction parallel to the central axis J1 is referred to by the term "vertical direction", "vertical", or "vertically", that radial directions centered on the central axis J1 are simply referred to by the term "radial direction", "radial", or "radially", and that a circumferential direction about the central axis J1 is simply referred to by the term "circumferential direction", "circumferential", or "circumferentially".

Figure 1:
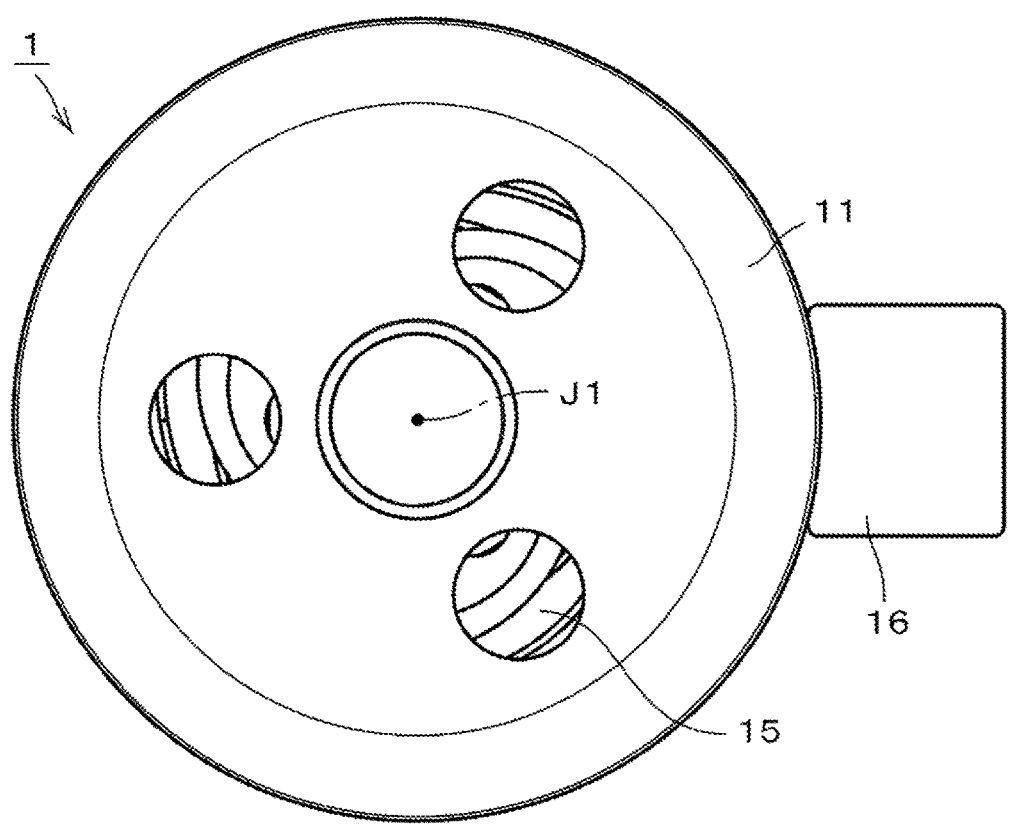
FIG. 1 is a plan view of a vibration motor according to a first preferred embodiment of the present invention.

FIG. 1 is a plan view of the vibration motor 1 according to a first preferred embodiment of the present invention.

Figure 2:
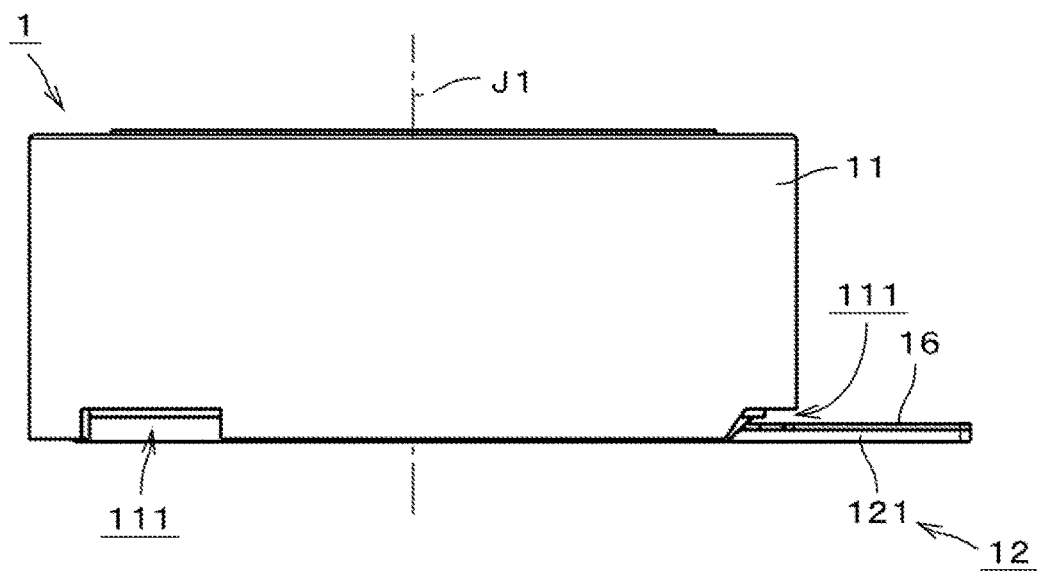
FIG. 2 is a side view of the vibration motor.
Figure 4:
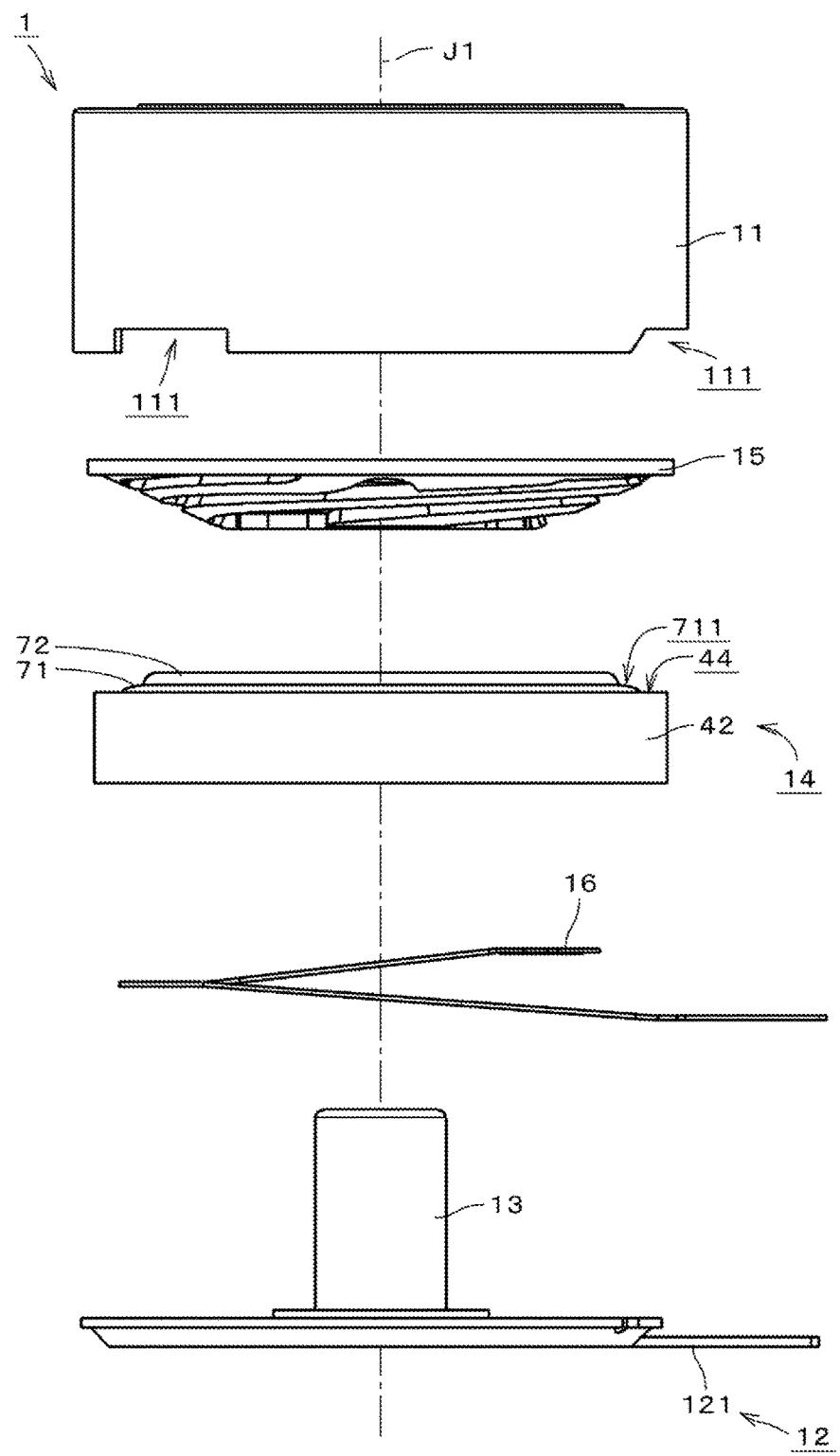
FIG. 4 is an exploded side view of the vibration motor.
Figure 5:
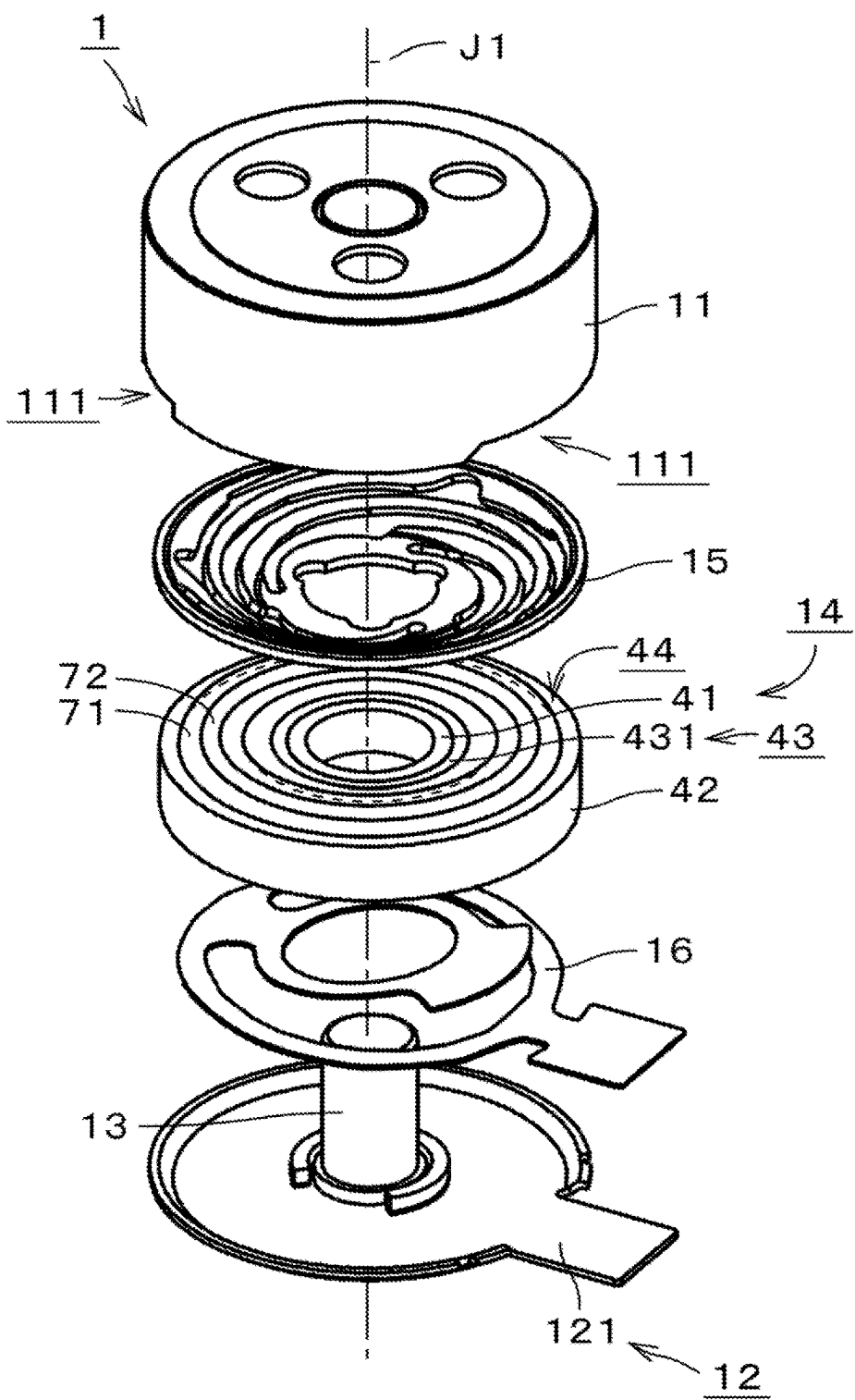
FIG. 5 is an exploded perspective view of the vibration motor.

FIG. 2 is a side view of the vibration motor 1. FIG. 3 is a vertical sectional view of the vibration motor 1. FIG. 4 is an exploded side view of the vibration motor 1. FIG. 5 is an exploded perspective view of the vibration motor 1. Parallel oblique lines are omitted for sections of details in FIG. 3. In FIG. 3, a state in which a vibrating portion 14 described below is stationary, without vibrating in a vertical direction, is illustrated. The position of the vibrating portion 14 in FIG. 3 will be hereinafter referred to as a "stationary position". Also in each of FIGS. 8, 9, 10, and 11, which are described below, the vibrating portion 14 is located at the stationary position.

The vibration motor 1 is a linear resonant actuator (LRA). The vibration motor 1 is used as, for example, a silent notification device in a mobile communication apparatus, such as a cellular phone. In other words, the vibration motor 1 is included in the mobile communication apparatus, for example.

The vibration motor 1 includes a cover portion 11 and a base portion 12. The cover portion 11 is substantially in the shape of a covered cylinder. The base portion 12 is arranged to extend perpendicularly to the central axis J1 extending in the vertical direction. The cover portion 11 is fixed to the base portion 12. The base portion 12 is arranged to close a lower opening of the cover portion 11. Each of the cover portion 11 and the base portion 12 is made of, for example, a metal. The cover portion 11 and the base portion 12 are joined to each other through, for example, welding. The base portion 12 may not necessarily be exactly perpendicular to the central axis J1, but may extend substantially perpendicularly to the central axis J1. In other words, the base portion 12 is arranged to extend perpendicularly or substantially perpendicularly to the central axis J1.

The base portion 12 includes a base projecting portion 121 arranged to extend substantially perpendicularly to the central axis J1. The base projecting portion 121 is arranged to project radially outward from the cover portion 11. A plurality of cuts 111 each of which extends in a circumferential direction are defined at a lower edge of the cover portion 11. The base projecting portion 121 is arranged to project radially outward from one of the cuts 111. In other words, a radially inner end portion of the base projecting portion 121 is arranged in one of the cuts 111. The plurality of cuts 111 defined in the cover portion 11 make it easy to align the base projecting portion 121 with one of the cuts 111 when fixing the base portion 12 to the cover portion 11.

The vibration motor 1 includes a magnet portion 13, the vibrating portion 14, an elastic member 15, a circuit board 16, an adhesive layer 71, and a viscous body 72. The magnet portion 13 is a substantially columnar member centered on the central axis J1. The magnet portion 13 is defined by a single monolithic member. The magnet portion 13 is fixed above the base portion 12, and is arranged to point in the vertical direction. For example, a lower end portion of the magnet portion 13 is fixed to an upper surface, i.e., an inner surface, of the base portion 12 through an adhesive or the like. Alternatively, an upper end portion of the magnet portion 13 may be fixed to a lower surface of a top cover portion of the cover portion 11, i.e., an inner surface of an upper portion of the cover portion 11, through an adhesive or the like.

The vibrating portion 14 is a substantially cylindrical member centered on the central axis J1. The vibrating portion 14 is arranged to extend all the way around the magnet portion 13. The vibrating portion 14 is arranged to have an inside diameter greater than the outside diameter of the magnet portion 13. The vibrating portion 14 is arranged to vibrate in the vertical direction along the magnet portion 13 without making contact with the magnet portion 13. Upper and lateral sides of the magnet portion 13 and the vibrating portion 14 are covered with the cover portion 11.

The vibrating portion 14 includes a coil portion 41, a mass portion 42, and a yoke 43. The coil portion 41 is a substantially cylindrical member centered on the central axis J1. The coil portion 41 is arranged radially opposite to the magnet portion 13. An inner circumferential surface of the coil portion 41 is arranged radially opposite to an outer circumferential surface of the magnet portion 13 with a predetermined gap therebetween.

The yoke 43 includes a cylindrical portion 431 and a flange portion 432. The cylindrical portion 431 is substantially cylindrical, and is centered on the central axis J1. The flange portion 432 is substantially in the shape of a circular ring, and is centered on the central axis J1. The flange portion 432 is arranged to extend radially outward from a lower end portion of the cylindrical portion 431. The cylindrical portion 431 and the flange portion 432 are defined by a single continuous monolithic member. The yoke 43 is arranged radially outside of the coil portion 41. An inner circumferential surface of the cylindrical portion 431 is fixed to an outer circumferential surface of the coil portion 41. The cylindrical portion 431 is fixed to the coil portion 41 through an adhesive, for example. The flange portion 432 may alternatively be arranged to extend radially outward from an upper end portion of the cylindrical portion 431, for example, or may not be provided.

The mass portion 42 is a substantially cylindrical member centered on the central axis J1. The mass portion 42 is a so-called weight. The mass portion 42 is arranged radially outside of the cylindrical portion 431 of the yoke 43 and the coil portion 41. An inner circumferential surface of the mass portion 42 is fixed to an outer circumferential surface of the cylindrical portion 431 of the yoke 43. An upper surface of the flange portion 432 of the yoke 43 is arranged to be in contact with a lower surface of the mass portion 42. The mass portion 42 is fixed to the yoke 43 through, for example, an adhesive or a double-sided tape, or through press fitting. The mass portion 42 is indirectly fixed to the coil portion 41 with the yoke 43 therebetween.

The elastic member 15 is arranged around the magnet portion 13 between the inner surface of the upper portion of the cover portion 11 and an upper portion of the vibrating portion 14. The elastic member 15 is a member capable of elastically deforming in the vertical direction through application of a vertical force. The elastic member 15 is, for example, defined by a plate-shaped spring material wound in a spiral shape. The elastic member 15 is, for example, defined by a volute spring the external shape of which is substantially a truncated cone. The elastic member 15 is arranged to extend radially inward in a downward direction from the inner surface of the upper portion of the cover portion 11. In other words, the elastic member 15 has an external shape projecting downward with decreasing distance from the central axis J1. An upper end portion of the elastic member 15 is fixed to the lower surface of the top cover portion of the cover portion 11, i.e., the inner surface of the upper portion of the cover portion 11. The upper end portion of the elastic member 15 is fixed to the cover portion 11 through welding, for example. A lower end portion of the elastic member 15 is fixed to an upper surface 44 of the vibrating portion 14. The lower end portion of the elastic member 15 is fixed to an upper surface of the mass portion 42 through welding, for example.

The adhesive layer 71 is fixed to the upper surface 44 of the vibrating portion 14. The adhesive layer 71 is arranged to extend in the circumferential direction below the elastic member 15. In other words, the adhesive layer 71 is arranged vertically opposite to the elastic member 15. In the preferred embodiment illustrated in FIGS. 3 to 5, the adhesive layer 71 is annular. The adhesive layer 71 is arranged on an annular recessed portion 441 defined in the upper surface 44 of the vibrating portion 14. Each of the adhesive layer 71 and the recessed portion 441 is, for example, substantially in the shape of a circular ring, and is centered on the central axis J1. The recessed portion 441 is defined in, for example, the upper surface of the mass portion 42.

In the preferred embodiment illustrated in FIGS. 3 to 5, an upper portion of the adhesive layer 71 is arranged at a level higher than the level of a portion of the upper surface 44 of the vibrating portion 14 which surrounds the recessed portion 441. An upper surface 711 of the adhesive layer 71 is entirely arranged at a level higher than the level of a portion of the upper surface 44 of the vibrating portion 14 which surrounds the adhesive layer 71, for example. The upper surface 711 of the adhesive layer 71 is arranged to be convex upward over the entire radial extent thereof. In addition, the upper surface 711 of the adhesive layer 71 is arranged to have a substantially identical shape over 360 degrees in the circumferential direction. The upper surface 711 of the adhesive layer 71 may be convex upward practically over the entire radial extent thereof. In other words, the upper surface 711 of the adhesive layer 71 is arranged to be convex upward over substantially the entire radial extent thereof. The upper surface 711 of the adhesive layer 71 is arranged to have a curvature continuously varying in a radial direction. For example, the curvature of the upper surface 711 of the adhesive layer 71 gradually decreases radially outward from a radially inner end of the upper surface 711 to an upper end of the upper surface 711, and gradually increases radially outward from the upper end of the upper surface 711 to a radially outer end of the upper surface 711.

The adhesive layer 71 is defined by, for example, applying an adhesive in an uncured state to the recessed portion 441 in such a manner that the adhesive will rise above the upper surface 44 of the vibrating portion 14 inside the recessed portion 441, and curing the adhesive. The adhesive layer 71 is defined by, for example, applying the adhesive to the vibrating portion 14 only once.

The viscous body 72 is in a paste, having viscosity. The viscous body 72 is, for example, grease. Note that the viscous body 72 may be a material other than grease as long as the material is in a paste having viscosity. The viscous body 72 is arranged to extend in the circumferential direction on the upper surface 711 of the adhesive layer 71. The viscous body 72 has a relatively high viscosity, so high as to maintain the shape of the viscous body 72 on the adhesive layer 71 when no external force is applied to the viscous body 72. In the preferred embodiment illustrated in FIGS. 3 to 5, the viscous body 72 is annular. The viscous body 72 is, for example, substantially in the shape of a circular ring, and is centered on the central axis J1.

The viscous body 72 is arranged below the elastic member 15. In other words, the viscous body 72 is arranged vertically opposite to the elastic member 15. An upper end portion of the viscous body 72 is arranged at a level higher than the level of the upper surface 44 of the vibrating portion 14. In the preferred embodiment illustrated in FIGS. 3 to 5, the viscous body 72 is arranged on an upper end portion of the upper surface 711 of the adhesive layer 71.

The circuit board 16 is arranged to supply an electric current from a power source to the coil portion 41. The circuit board 16 is a flexible substrate including a flexible printed circuit (FPC). The circuit board 16 is relatively thin and soft. The circuit board 16 is arranged between the base portion 12 and the vibrating portion 14, and is fixed to the upper surface of the base portion 12 and a lower surface of the vibrating portion 14. The circuit board 16 is fixed to each of the base portion 12 and the vibrating portion 14 through, for example, an adhesive.

In the vibration motor 1, once the electric current is passed in the coil portion 41 through the circuit board 16, a magnetic field is generated around the coil portion 41 and the yoke 43. This magnetic field and a magnetic field around the magnet portion 13 together generate forces that cause the vibrating portion 14 to move in the vertical direction. The forces that cause the vibrating portion 14 to move in the vertical direction will be hereinafter referred to as "vibrating forces". The vibrating portion 14 is supported by the elastic member 15 in the vertical direction, and accordingly vibrates in the vertical direction through forces received from the magnetic fields and resilience of the elastic member 15.

Figure 6:
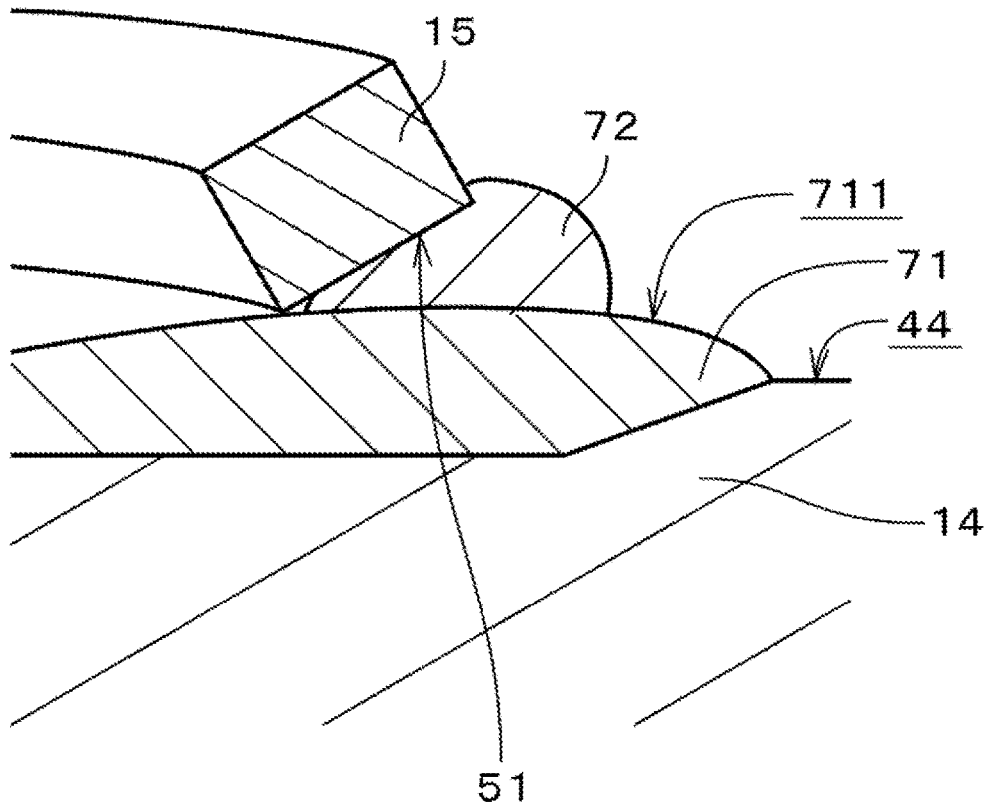
FIG. 6 is an enlarged vertical sectional view of a portion of the vibration motor.

When the vibrating portion 14 vibrates in the vertical direction, the elastic member 15 expands and contracts in the vertical direction. When the vibrating portion 14 moves upward above the stationary position to compress the elastic member 15, the vertical distance between the upper surface 44 of the vibrating portion 14 and a lower surface of the elastic member 15 is reduced at a radial position where the adhesive layer 71 is provided as illustrated in FIG. 6. This causes the elastic member 15 to make contact with the viscous body 72 on the adhesive layer 71. The viscous body 72 on the adhesive layer 71 is deformed as a result of a contact with the elastic member 15. In addition, the elastic member 15 makes contact with the upper surface 711 of the adhesive layer 71 as well.

Specifically, the elastic member 15 includes a "viscous body opposed portion" 51 arranged vertically opposite to the viscous body 72, and a radially inner portion of the viscous body opposed portion 51 makes contact with the upper surface 711 of the adhesive layer 71. As a result, a gap is maintained between the elastic member 15 and the upper surface 711 of the adhesive layer 71 over a region radially outside of an area of contact between the viscous body opposed portion 51 and the adhesive layer 71. This allows the viscous body 72 to be held in the gap without being scattered radially outward by being compressed by the elastic member 15.

Figure 7:
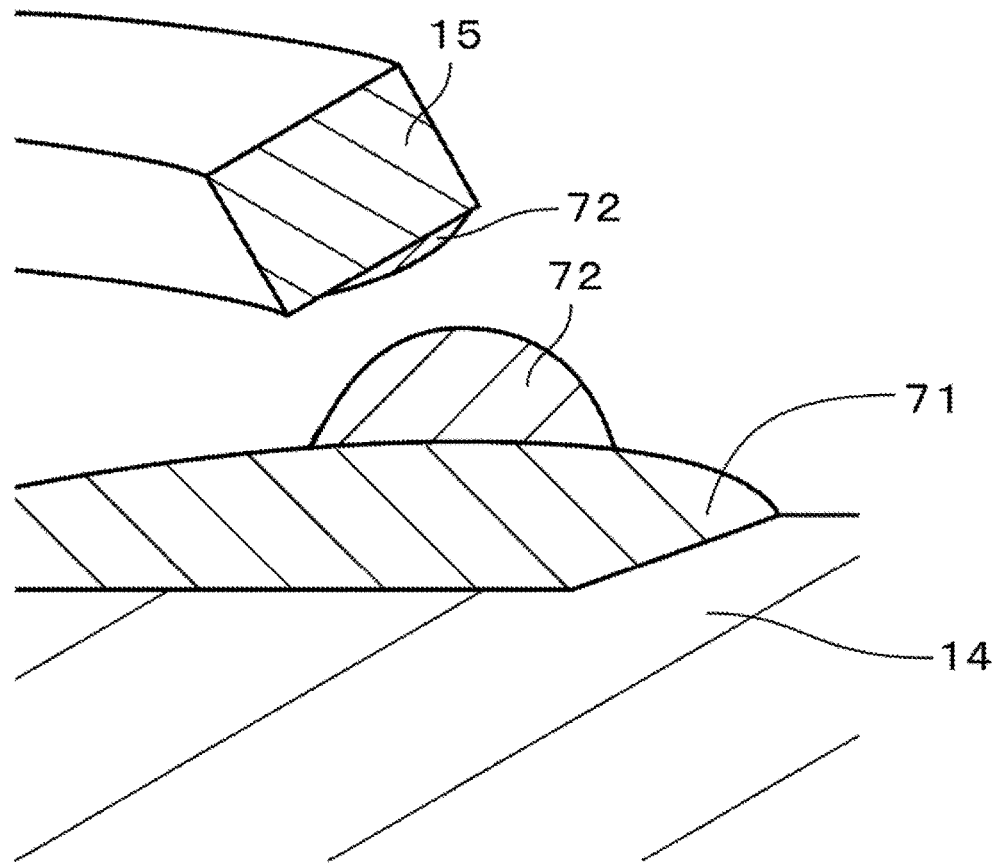
FIG. 7 is an enlarged vertical sectional view of a portion of the vibration motor.

As illustrated in FIG. 7, when the vibrating portion 14 moves downward thereafter, a portion of the viscous body 72 on the adhesive layer 71 sticks to the elastic member 15, and separates upward from the viscous body 72 on the adhesive layer 71 together with the elastic member 15. In the vibration motor 1, as the vertical movement of the vibrating portion 14 is repeated, portions of the viscous body 72 on the adhesive layer 71 move to the elastic member 15 one after another. In other words, as the vibrating portion 14 vibrates, portions of the viscous body 72 are intermittently supplied from the vibrating portion 14 to the elastic member 15.

As described above, the vibration motor 1 includes the cover portion 11, the base portion 12, the magnet portion 13, the vibrating portion 14, the elastic member 15, the adhesive layer 71, and the viscous body 72. The base portion 12 is arranged to extend perpendicularly to the central axis J1 extending in the vertical direction. The magnet portion 13 is fixed above the base portion 12, and is arranged to point in the vertical direction. The vibrating portion 14 includes the coil portion 41 arranged radially opposite to the magnet portion 13. The vibrating portion 14 is arranged around the magnet portion 13, and vibrates in the vertical direction. The cover portion 11 covers the upper and lateral sides of the magnet portion 13 and the vibrating portion 14, and is fixed to the base portion 12. The elastic member 15 is arranged around the magnet portion 13 between the inner surface of the upper portion of the cover portion 11 and the upper portion of the vibrating portion 14. The elastic member 15 is arranged to extend radially inward in the downward direction from the inner surface of the upper portion of the cover portion 11. The adhesive layer 71 is fixed to the upper surface of the vibrating portion 14, and is arranged to extend in the circumferential direction below the elastic member 15. The viscous body 72 is arranged to extend in the circumferential direction on the upper surface of the adhesive layer 71, and is arranged vertically opposite to the elastic member 15. The viscous body 72 is in a paste. The upper end portion of the viscous body 72 is arranged at a level higher than the level of the upper surface 44 of the vibrating portion 14.

In the vibration motor 1, a portion of the viscous body 72 sticks to the elastic member 15 when the elastic member 15 approaches and makes indirect contact with the vibrating portion 14. Accordingly, vibration at an unwanted frequency component that is caused in the elastic member 15 by the indirect contact of the elastic member 15 with the vibrating portion 14, e.g., vibration at a frequency component other than a natural vibration frequency, is absorbed by elastic action of the viscous body 72. In other words, the sticking of a portion of the viscous body 72 to the elastic member 15 reduces variations in vibration frequency components of the elastic member 15 caused by the indirect contact of the elastic member 15 with the vibrating portion 14, leading to stabilizing the vibration frequency of the elastic member 15. This allows the vibrating portion 14 to vibrate at a desired vibration frequency to increase the amount of vibration of the vibration motor 1. The desired vibration frequency is, for example, a natural vibration frequency of the elastic member 15. Note that, although the sticking of portions of the viscous body 72 to the elastic member 15 also reduces vibration at the above desired frequency component to some degree, the reduction of the vibration at the unwanted frequency component results in a greater proportion of the desired frequency component in all frequency components. This leads to an increased amount of vibration of the vibration motor 1 as mentioned above.

In addition, in the vibration motor 1, when the elastic member 15 is compressed, the elastic member 15 makes contact with the adhesive layer 71, and this prevents or reduces the likelihood of a direct contact between the elastic member 15 and the vibrating portion 14. This contributes to preventing noise caused by a collision between the elastic member 15 and the vibrating portion 14. Moreover, compared to the case where a damper separate from the vibrating portion 14 is fitted onto the vibrating portion 14 to prevent a direct contact between the elastic member 15 and the vibrating portion 14, a reduction in the number of parts of the vibration motor 1 and a reduction in the number of steps for assembling the vibration motor 1 are achieved. This contributes to preventing or reducing an increase in the production cost of the vibration motor 1.

In the vibration motor 1, the upper surface 711 of the adhesive layer 71 is arranged to be convex upward over the entire radial extent thereof. In addition, the viscous body 72 is arranged on the upper end portion of the upper surface 711 of the adhesive layer 71. This allows the gap to be maintained between the elastic member 15 and the upper surface 711 of the adhesive layer 71 over the region radially outside of the area of contact between the elastic member 15 and the adhesive layer 71. In other words, an excessive contact between the elastic member 15 and the viscous body 72 is prevented. This contributes to preventing the viscous body 72 from being scattered radially outward by being compressed by the elastic member 15, and maintaining appropriate holding of the viscous body 72 on the adhesive layer 71.

As mentioned above, the adhesive layer 71 is annular, and the viscous body 72 is also annular. This allows the viscous body 72 on the adhesive layer 71 to easily stick to the elastic member 15 at at least one position in the circumferential direction. This contributes to more securely causing the viscous body 72 on the adhesive layer 71 to stick to the elastic member 15.

In addition, the adhesive layer 71 is arranged on the annular recessed portion 441 defined in the upper surface 44 of the vibrating portion 14. This allows the adhesive layer 71 to be easily defined on the vibrating portion 14. Further, the adhesive layer 71 can be arranged on the vibrating portion 14 with high positional precision.

Figure 8:
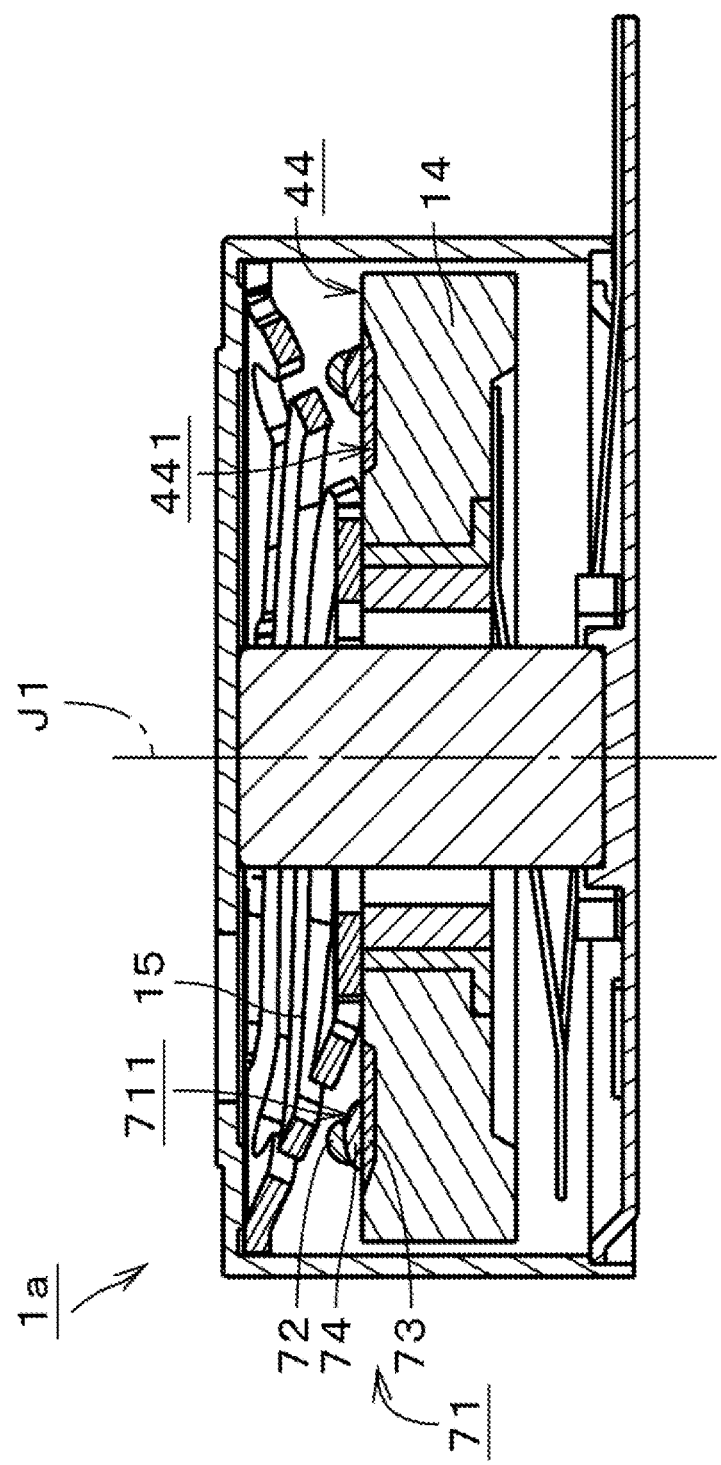
FIG. 8 is a vertical sectional view of a vibration motor according to a second preferred embodiment of the present invention.

FIG. 8 is a vertical sectional view illustrating a vibration motor 1a according to a second preferred embodiment of the present invention. The vibration motor 1a is similar in structure to the vibration motor 1, and is different from the vibration motor 1 illustrated in FIG. 3 only in the shape of an adhesive layer 71 and the arrangement of a viscous body 72. In the following description, members or portions of the vibration motor 1a that have their equivalents in the vibration motor 1 will be designated by the same reference numerals as those of their equivalents in the vibration motor 1.

The adhesive layer 71 of the vibration motor 1a includes an adhesive lower portion 73 and a projecting portion 74. The adhesive lower portion 73 is fixed to an upper surface 44 of a vibrating portion 14. The adhesive lower portion 73 is arranged, for example, inside an annular recessed portion 441 defined in the upper surface 44 of the vibrating portion 14. The adhesive lower portion 73 includes an upper surface extending perpendicularly to a central axis J1. The upper surface of the adhesive lower portion 73 may not necessarily be exactly perpendicular to the central axis J1, but may be substantially perpendicular to the central axis J1. In other words, the adhesive lower portion 73 includes an upper surface extending perpendicularly or substantially perpendicularly to the central axis J1. The upper surface of the adhesive lower portion 73 is arranged, for example, at a level the same or substantially the same as the level of a portion of the upper surface 44 of the vibrating portion 14 which surrounds the adhesive lower portion 73. The projecting portion 74 is arranged to project upward from the adhesive lower portion 73. The viscous body 72 is arranged on an upper end portion of the projecting portion 74. Each of the adhesive lower portion 73 and the projecting portion 74 is arranged to extend in the circumferential direction below an elastic member 15. In other words, each of the adhesive lower portion 73 and the projecting portion 74 is arranged vertically opposite to the elastic member 15. In the preferred embodiment illustrated in FIG. 8, each of the adhesive lower portion 73 and the projecting portion 74 is annular.

In the vibration motor 1a, the adhesive lower portion 73 is defined by applying an adhesive in an uncured state inside the recessed portion 441 and curing the adhesive, and the projecting portion 74 is defined by applying an adhesive in an uncured state onto the adhesive lower portion 73 and curing the adhesive, for example. The adhesive layer 71 of the vibration motor 1a is defined by applying the adhesive to the vibrating portion 14 twice, for example.

When the vibrating portion 14 moves upward above the stationary position to compress the elastic member 15, the elastic member 15 makes contact with the viscous body 72 on the adhesive layer 71. In addition, the elastic member 15 makes contact with the projecting portion 74 of the adhesive layer 71 as well. This allows a gap to be maintained between the elastic member 15 and an upper surface 711 of the adhesive layer 71 over a region radially outside of an area of contact between the elastic member 15 and the projecting portion 74. The viscous body 72 is thus held in the gap without being scattered radially outward by being compressed by the elastic member 15.

In the vibration motor 1a, as in the vibration motor 1 illustrated in FIG. 3, when the elastic member 15 makes indirect contact with the vibrating portion 14, a portion of the viscous body 72 sticks to the elastic member 15. This leads to stabilizing the vibration frequency of the elastic member 15. This allows the vibrating portion 14 to vibrate at a desired vibration frequency to increase the amount of vibration of the vibration motor 1a.

In the vibration motor 1a, the adhesive layer 71 includes the adhesive lower portion 73 and the projecting portion 74. The adhesive lower portion 73 includes the upper surface extending perpendicularly to the central axis J1. The projecting portion 74 is arranged to project upward from the adhesive lower portion 73. The viscous body 72 is arranged on the upper end portion of the projecting portion 74. In the vibration motor 1a, the elastic member 15 makes contact with the projecting portion 74 over a region radially inside of the viscous body 72, and this contributes to preventing the viscous body 72 from being scattered by an excessive contact between the elastic member 15 and the viscous body 72. This in turn contributes to maintaining appropriate holding of the viscous body 72 on the adhesive layer 71. In addition, the amount of the adhesive used to define the adhesive layer 71 can be reduced.

Figure 9:
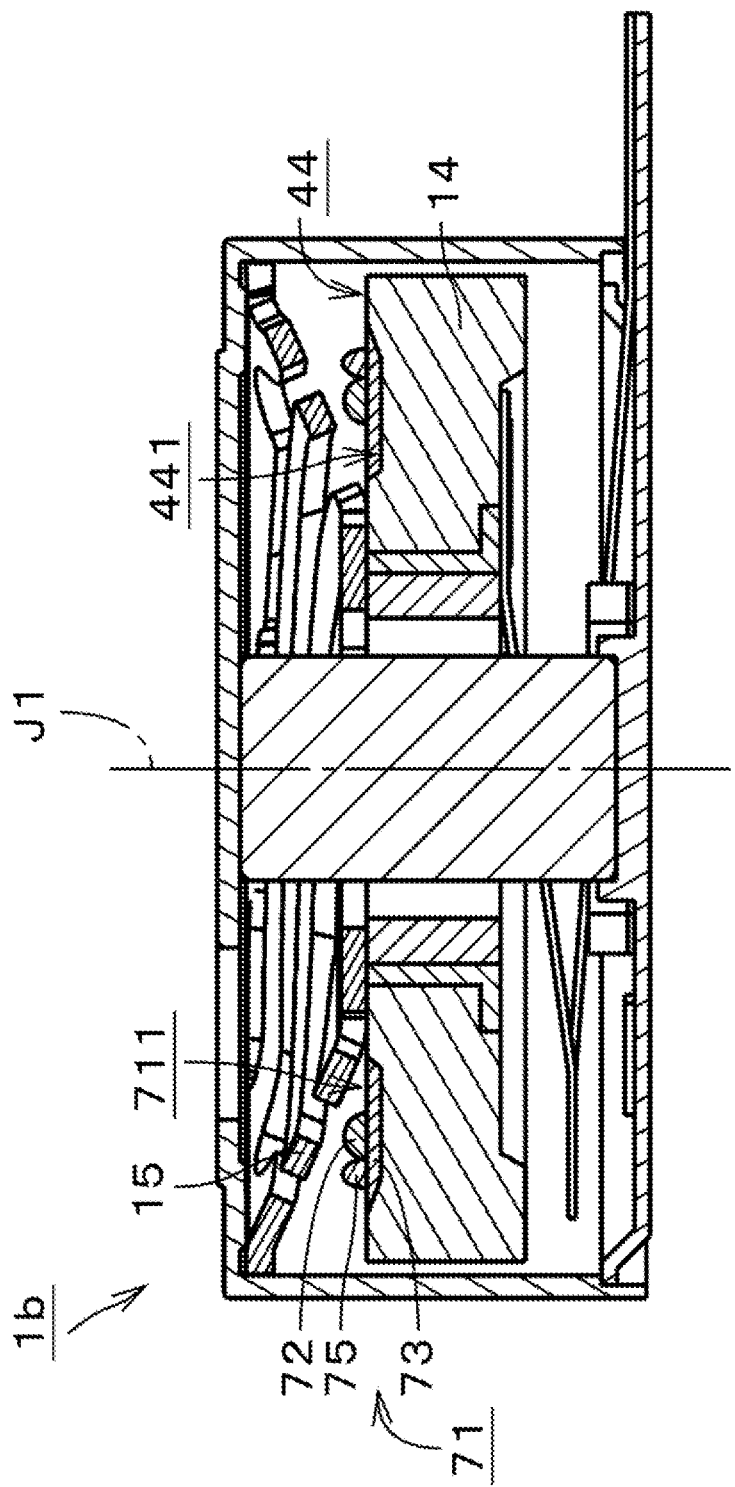
FIG. 9 is a vertical sectional view of a vibration motor according to a third preferred embodiment of the present invention.

FIG. 9 is a vertical sectional view illustrating a vibration motor 1b according to a third preferred embodiment of the present invention. The vibration motor 1b is similar in structure to the vibration motor 1a, and is different from the vibration motor 1a illustrated in FIG. 8 only in the shape of an adhesive layer 71 and the arrangement of a viscous body 72. In the following description, members or portions of the vibration motor 1b that have their equivalents in the vibration motor 1a will be designated by the same reference numerals as those of their equivalents in the vibration motor 1a.

The adhesive layer 71 of the vibration motor 1b includes an adhesive lower portion 73 and an outer projecting portion 75. The adhesive lower portion 73 is similar in structure to the adhesive lower portion 73 of the vibration motor 1a illustrated in FIG. 8, and includes an upper surface extending perpendicularly to a central axis J1. The upper surface of the adhesive lower portion 73 may not necessarily be exactly perpendicular to the central axis J1, but may be substantially perpendicular to the central axis J1. In other words, the adhesive lower portion 73 includes an upper surface extending perpendicularly or substantially perpendicularly to the central axis J1. The outer projecting portion 75 is arranged to project upward from the adhesive lower portion 73. The viscous body 72 is arranged radially inside of the outer projecting portion 75 and in contact with the outer projecting portion 75. Each of the adhesive lower portion 73 and the outer projecting portion 75 is arranged to extend in the circumferential direction below an elastic member 15. In other words, each of the adhesive lower portion 73 and the outer projecting portion 75 is arranged vertically opposite to the elastic member 15. In the preferred embodiment illustrated in FIG. 9, each of the adhesive lower portion 73 and the outer projecting portion 75 is annular.

In the vibration motor 1b, the adhesive lower portion 73 is defined by applying an adhesive in an uncured state inside a recessed portion 441 and curing the adhesive, and the outer projecting portion 75 is defined by applying an adhesive in an uncured state onto the adhesive lower portion 73 and curing the adhesive, for example. The adhesive layer 71 of the vibration motor 1b is defined by applying the adhesive to a vibrating portion 14 twice, for example.

When the vibrating portion 14 moves upward above the stationary position to compress the elastic member 15, the elastic member 15 makes contact with the viscous body 72 on the adhesive layer 71. In addition, the elastic member 15 makes contact with the outer projecting portion 75 of the adhesive layer 71 as well. This allows a gap to be maintained between the elastic member 15 and an upper surface 711 of the adhesive layer 71 over a region radially inside of an area of contact between the elastic member 15 and the outer projecting portion 75. The viscous body 72 is thus held in the gap without being compressed by the elastic member 15. The viscous body 72 is arranged radially inside of and in contact with the outer projecting portion 75, and this prevents or reduces the likelihood of a radially outward movement of the viscous body 72 caused by a contact with the elastic member 15.

In the vibration motor 1b, as in the vibration motor 1 illustrated in FIG. 3, when the elastic member 15 makes indirect contact with the vibrating portion 14, a portion of the viscous body 72 sticks to the elastic member 15. This leads to stabilizing the vibration frequency of the elastic member 15. This allows the vibrating portion 14 to vibrate at a desired vibration frequency to increase the amount of vibration of the vibration motor 1b.

The adhesive layer 71 of the vibration motor 1b includes the adhesive lower portion 73 and the outer projecting portion 75. The adhesive lower portion 73 includes the upper surface extending perpendicularly to the central axis J1. The outer projecting portion 75 is arranged to project upward from the adhesive lower portion 73. The viscous body 72 is arranged radially inside of the outer projecting portion 75 and in contact with the outer projecting portion 75. In the vibration motor 1b, the elastic member 15 makes contact with the outer projecting portion 75, and this contributes to preventing the viscous body 72 from being scattered by an excessive contact between the elastic member 15 and the viscous body 72. In addition, a radially outward movement of the viscous body 72 caused by a contact with the elastic member 15 can be prevented, or the likelihood thereof can be reduced. This in turn contributes to maintaining appropriate holding of the viscous body 72 on the adhesive layer 71. Further, the amount of the adhesive used to define the adhesive layer 71 can be reduced.

Figure 10:
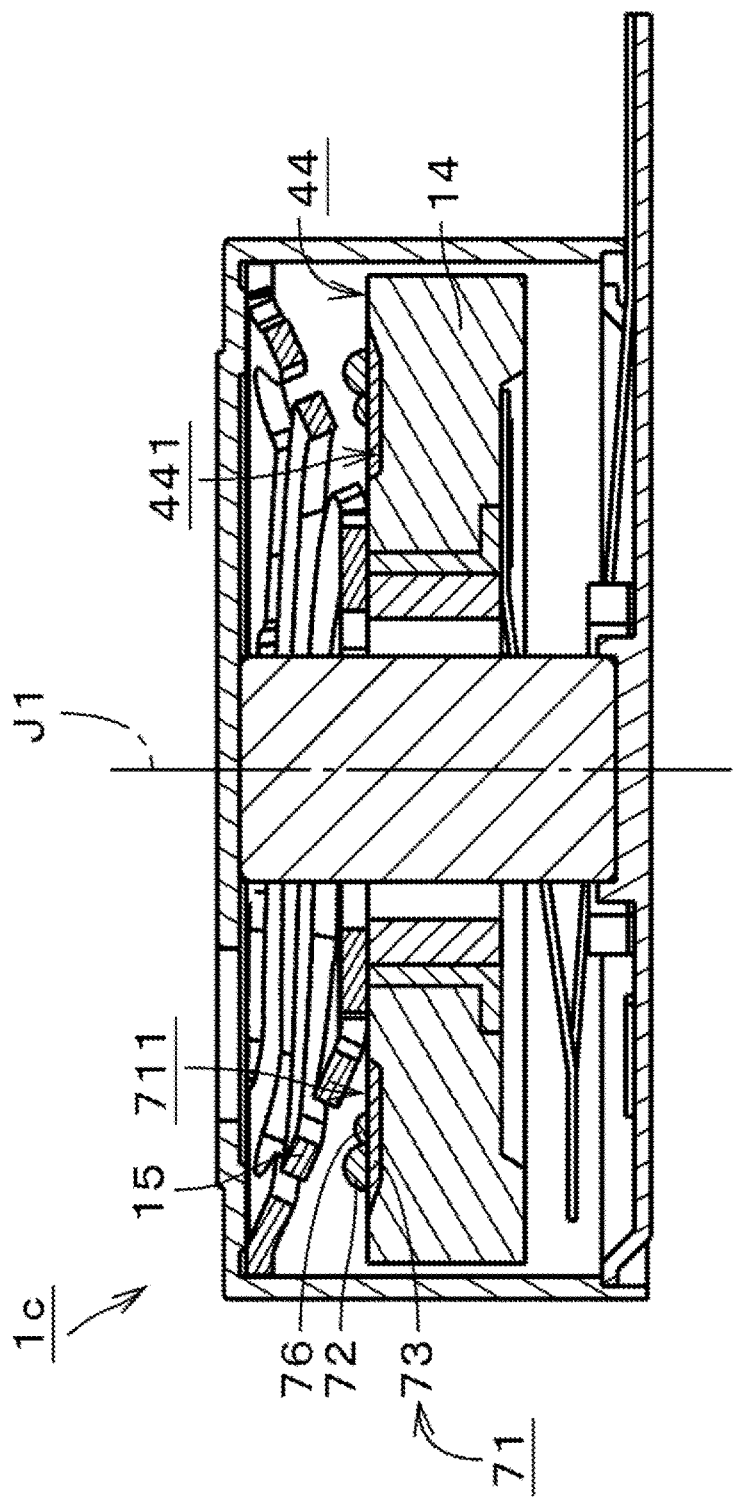
FIG. 10 is a vertical sectional view of a vibration motor according to a fourth preferred embodiment of the present invention.

FIG. 10 is a vertical sectional view illustrating a vibration motor 1c according to a fourth preferred embodiment of the present invention. The vibration motor 1c is similar in structure to the vibration motor 1a, and is different from the vibration motor 1a illustrated in FIG. 8 only in the shape of an adhesive layer 71 and the arrangement of a viscous body 72. In the following description, members or portions of the vibration motor 1c that have their equivalents in the vibration motor 1a will be designated by the same reference numerals as those of their equivalents in the vibration motor 1a.

The adhesive layer 71 of the vibration motor 1c includes an adhesive lower portion 73 and an inner projecting portion 76. The adhesive lower portion 73 is similar in structure to the adhesive lower portion 73 of the vibration motor 1a illustrated in FIG. 8, and includes an upper surface extending perpendicularly to a central axis J1. The upper surface of the adhesive lower portion 73 may not necessarily be exactly perpendicular to the central axis J1, but may be substantially perpendicular to the central axis J1. In other words, the adhesive lower portion 73 includes an upper surface extending perpendicularly or substantially perpendicularly to the central axis J1. The inner projecting portion 76 is arranged to project upward from the adhesive lower portion 73. The viscous body 72 is arranged radially outside of the inner projecting portion 76 and in contact with the inner projecting portion 76. Each of the adhesive lower portion 73 and the inner projecting portion 76 is arranged to extend in the circumferential direction below an elastic member 15. In other words, each of the adhesive lower portion 73 and the inner projecting portion 76 is arranged vertically opposite to the elastic member 15. In the preferred embodiment illustrated in FIG. 10, each of the adhesive lower portion 73 and the inner projecting portion 76 is annular.

In the vibration motor 1c, the adhesive lower portion 73 is defined by applying an adhesive in an uncured state inside a recessed portion 441 and curing the adhesive, and the inner projecting portion 76 is defined by applying an adhesive in an uncured state onto the adhesive lower portion 73 and curing the adhesive, for example. The adhesive layer 71 of the vibration motor 1c is defined by applying the adhesive to a vibrating portion 14 twice, for example.

When the vibrating portion 14 moves upward above the stationary position to compress the elastic member 15, the elastic member 15 makes contact with the viscous body 72 on the adhesive layer 71. In addition, the elastic member 15 makes contact with the inner projecting portion 76 of the adhesive layer 71 as well. This allows a gap to be maintained between the elastic member 15 and an upper surface 711 of the adhesive layer 71 over a region radially outside of an area of contact between the elastic member 15 and the inner projecting portion 76. The viscous body 72 is thus held in the gap without being compressed by the elastic member 15.

In the vibration motor 1c, as in the vibration motor 1 illustrated in FIG. 3, when the elastic member 15 makes indirect contact with the vibrating portion 14, a portion of the viscous body 72 sticks to the elastic member 15. This leads to stabilizing the vibration frequency of the elastic member 15. This allows the vibrating portion 14 to vibrate at a desired vibration frequency to increase the amount of vibration of the vibration motor 1c.

The adhesive layer 71 of the vibration motor 1c includes the adhesive lower portion 73 and the inner projecting portion 76. The adhesive lower portion 73 includes the upper surface extending perpendicularly to the central axis J1. The inner projecting portion 76 is arranged to project upward from the adhesive lower portion 73. The viscous body 72 is arranged radially outside of the inner projecting portion 76 and in contact with the inner projecting portion 76. In the vibration motor 1c, the elastic member 15 makes contact with the inner projecting portion 76, and this contributes to preventing the viscous body 72 from being scattered by an excessive contact between the elastic member 15 and the viscous body 72. This in turn contributes to maintaining appropriate holding of the viscous body 72 on the adhesive layer 71. In addition, the amount of the adhesive used to define the adhesive layer 71 can be reduced.

Figure 11:
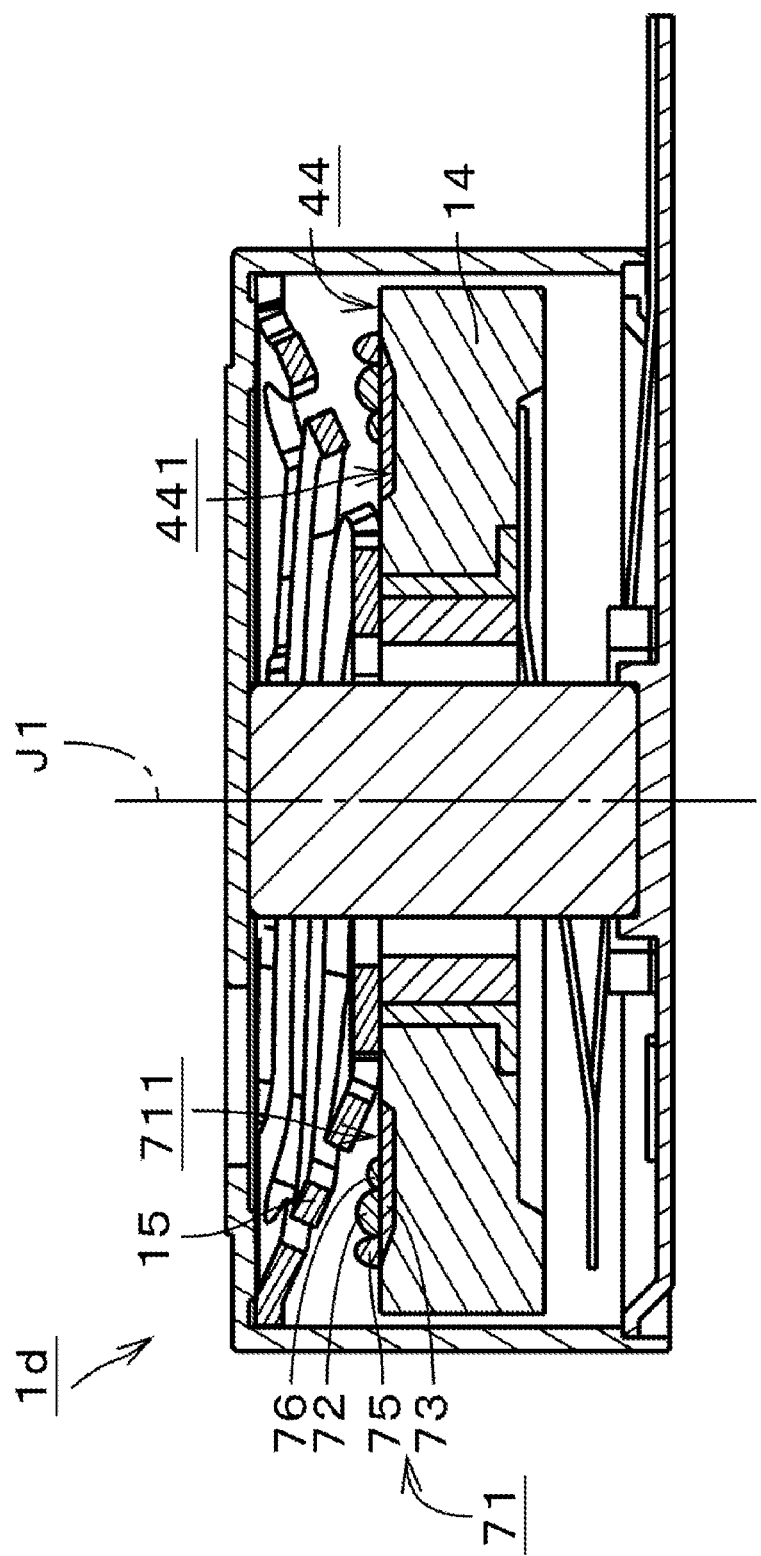
FIG. 11 is a vertical sectional view of a vibration motor according to a fifth preferred embodiment of the present invention.

FIG. 11 is a vertical sectional view illustrating a vibration motor 1d according to a fifth preferred embodiment of the present invention. The vibration motor 1d is similar in structure to the vibration motor 1b illustrated in FIG. 9 except that an adhesive layer 71 further includes an inner projecting portion 76. In the following description, members or portions of the vibration motor 1d that have their equivalents in the vibration motor 1b will be designated by the same reference numerals as those of their equivalents in the vibration motor 1b.

The adhesive layer 71 of the vibration motor 1d includes an adhesive lower portion 73, an outer projecting portion 75, and the inner projecting portion 76. The inner projecting portion 76 is similar in structure to the inner projecting portion 76 of the vibration motor 1c illustrated in FIG. 10, and is arranged to project upward from the adhesive lower portion 73. An upper end portion of the inner projecting portion 76 is arranged at a level lower than the level of an upper end portion of the outer projecting portion 75, for example. The outer projecting portion and the inner projecting portion 76 are arranged to be concentric, with a central axis J1 as a center. A viscous body 72 is arranged radially inside of the outer projecting portion 75 and radially outside of the inner projecting portion 76. In other words, the viscous body 72 is arranged between the outer projecting portion 75 and the inner projecting portion 76. The viscous body 72 is arranged to be in contact with both the outer projecting portion 75 and the inner projecting portion 76.

In the vibration motor 1d, the adhesive lower portion 73 is defined by applying an adhesive in an uncured state inside a recessed portion 441 and curing the adhesive, and the outer projecting portion 75 is defined by applying an adhesive in an uncured state onto the adhesive lower portion 73 and curing the adhesive, for example. In addition, the inner projecting portion 76 is defined by applying an adhesive in an uncured state onto the adhesive lower portion 73 and curing the adhesive. The adhesive layer 71 of the vibration motor 1d is defined by applying the adhesive to a vibrating portion 14 three times, for example.

When the vibrating portion 14 moves upward above the stationary position to compress an elastic member 15, the elastic member 15 makes contact with the viscous body 72 on the adhesive layer 71. In addition, the elastic member 15 makes contact with the inner projecting portion 76 of the adhesive layer 71 as well. This allows a gap to be maintained between the elastic member 15 and an upper surface 711 of the adhesive layer 71 over a region radially outside of an area of contact between the elastic member 15 and the inner projecting portion 76. The viscous body 72 is thus held in the gap without being compressed by the elastic member 15. In addition, the viscous body 72 is arranged radially inside of and in contact with the outer projecting portion 75, and this prevents or reduces the likelihood of a radially outward movement of the viscous body 72 caused by a contact with the elastic member 15. The elastic member 15 may make contact with the outer projecting portion 75, or may make contact with both the inner projecting portion 76 and the outer projecting portion 75.

In the vibration motor 1d, as in the vibration motor 1 illustrated in FIG. 3, when the elastic member 15 makes indirect contact with the vibrating portion 14, a portion of the viscous body 72 sticks to the elastic member 15. This leads to stabilizing the vibration frequency of the elastic member 15. This allows the vibrating portion 14 to vibrate at a desired vibration frequency to increase the amount of vibration of the vibration motor 1d. In the vibration motor 1d, the elastic member 15 makes contact with at least one of the outer projecting portion 75 and the inner projecting portion 76, and this contributes to preventing the viscous body 72 from being scattered by an excessive contact between the elastic member 15 and the viscous body 72. In addition, the outer projecting portion 75 prevents or reduces the likelihood of a radially outward movement of the viscous body 72 caused by a contact with the elastic member 15. This contributes to maintaining appropriate holding of the viscous body 72 on the adhesive layer 71. Further, the amount of the adhesive used to define the adhesive layer 71 can be reduced.

In the vibration motor 1, each of the adhesive layer 71 and the viscous body 72 may not necessarily be annular as long as at least one adhesive layer 71 is arranged in the circumferential direction and at least one viscous body 72 is arranged in the circumferential direction. The recessed portion 441 defined in the upper surface 44 of the vibrating portion 14 may not necessarily be annular, either. The same is true of each of the vibration motors 1a to 1d.

Figure 12:
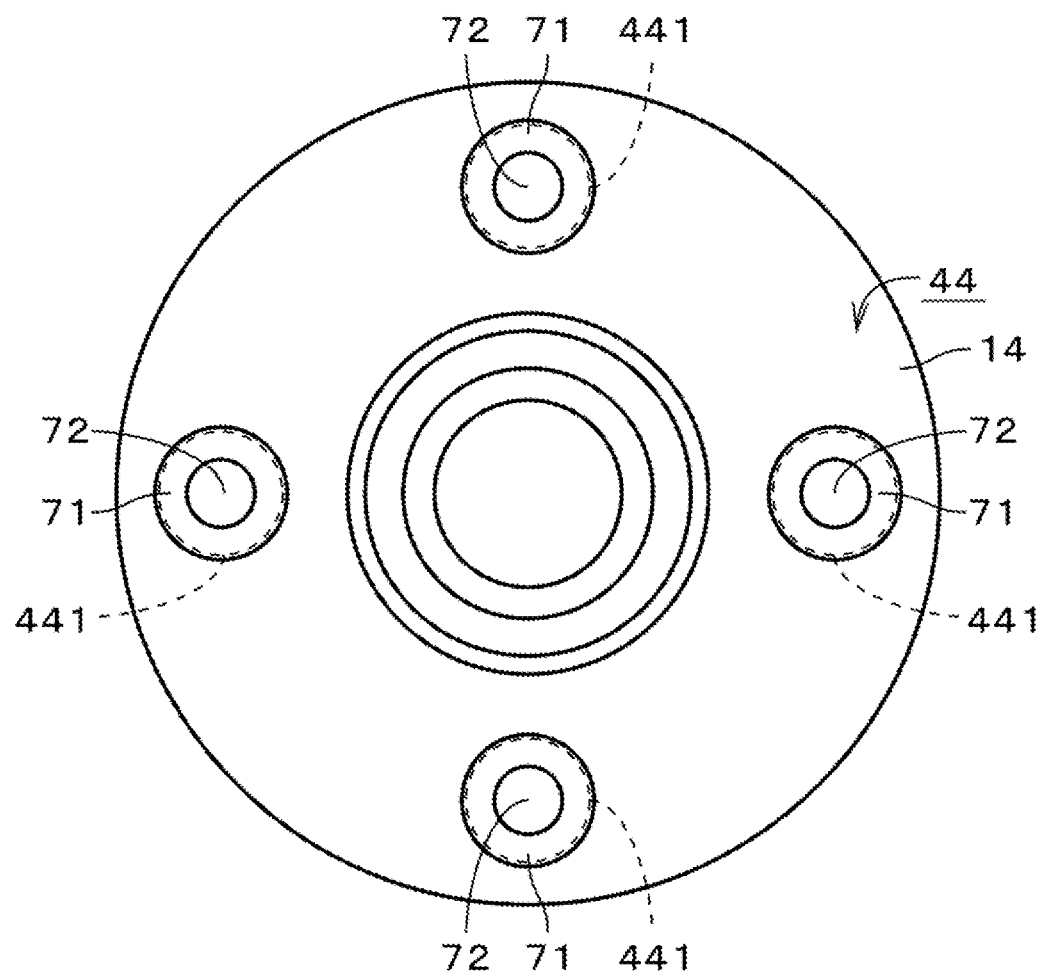
FIG. 12 is a plan view illustrating a vibrating portion, adhesive layers, and viscous bodies of a vibration motor according to another preferred embodiment of the present invention.

FIG. 12 is a plan view illustrating a vibrating portion 14, adhesive layers 71, and viscous bodies 72 of a vibration motor according to another preferred embodiment of the present invention. As illustrated in FIG. 12, a plurality of recessed portions 441 discontinuous in the circumferential direction are defined in an upper surface 44 of the vibrating portion 14, and the adhesive layer 71 is arranged on each of the plurality of recessed portions 441. In the preferred embodiment illustrated in FIG. 12, the adhesive layers 71 are arranged discontinuously in the circumferential direction, and the viscous bodies 72 are arranged discontinuously in the circumferential direction on the adhesive layers 71. This contributes to reducing the amount of the adhesive used to define the adhesive layer(s) 71, and the amount of the viscous bod(ies) 72 used.

In FIG. 12, each of the recessed portions 441, the adhesive layers 71, and the viscous bodies 72 is circular or substantially circular in a plan view. Note, however, that the shape of each of the recessed portions 441, the adhesive layers 71, and the viscous bodies 72 may be modified in various manners. Also note that the number of recessed portions 441, the number of adhesive layers 71, and the number of viscous bodies 72 are not limited to four, but may be modified in various manners. In the vibration motor 1, the viscous bodies 72 may be arranged discontinuously in the circumferential direction on the annular adhesive layer 71 on the annular recessed portion 441 defined in the upper surface 44 of the vibrating portion 14. The same is true of each of the vibration motors 1a to 1d.

Note that each of the vibration motors 1 and 1a to 1d described above may be modified in various manners.

In the vibration motor 1 illustrated in FIGS. 1 to 5, the elastic member 15 may be in contact with the viscous body 72 on the adhesive layer 71 in a situation in which the vibrating portion 14 is located at the stationary position illustrated in FIG. 3. In this case, the area of contact between the elastic member 15 and the viscous body on the adhesive layer 71 increases as the vibrating portion 14 moves upward above the stationary position. When the vibrating portion 14 moves downward thereafter, a portion of the viscous body 72 on the adhesive layer 71 sticks to the elastic member 15, and separates upward from the viscous body 72 on the adhesive layer 71 together with the elastic member 15. The same is true of each of the vibration motors 1a to 1d illustrated in FIGS. 8 to 11, respectively.

The magnet portion 13 may not necessarily be defined by a single monolithic member. The magnet portion 13 may alternatively include, for example, two substantially columnar magnets each of which points in the vertical direction, and a pole piece arranged between the two magnets.

The structure and shape of each of the vibrating portion 14 and the elastic member 15 may be modified appropriately. For example, the yoke 43 may be omitted from the vibrating portion 14 with the coil portion 41 directly fixed to the inner circumferential surface of the mass portion 42. Also note that the recessed portion 441 may not necessarily be defined in the upper surface 44 of the vibrating portion 14. For example, the upper surface 44 may be flat, and the adhesive layer 71 may be fixed on the flat upper surface 44.

Fitting and fixing of the members of each of the vibration motors 1 and 1a to 1d may be achieved indirectly. For example, the elastic member 15 may be fixed to the cover portion 11 with another member intervening therebetween, and the cover portion 11 and the base portion 12 may be fixed to each other with another member intervening therebetween.

Note that features of the above-described preferred embodiments and the modifications thereof may be combined appropriately as long as no conflict arises.

Vibration motors according to preferred embodiments of the present invention may be used for various purposes. Vibration motors according to preferred embodiments of the present invention are preferably used as silent notification devices in mobile communication apparatuses, such as, for example, cellular phones.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vibration motor comprising:
   a base portion arranged to extend perpendicularly to a central axis extending in a vertical direction;
   a magnet portion fixed above the base portion, and arranged to point in the vertical direction;
   a vibrating portion including a coil portion arranged radially opposite to the magnet portion, the vibrating portion being arranged around the magnet portion to vibrate in the vertical direction;
   a cover portion arranged to cover upper and lateral sides of the magnet portion and the vibrating portion, and fixed to the base portion;
   an elastic member arranged around the magnet portion between an inner surface of an upper portion of the cover portion and an upper portion of the vibrating portion, and arranged to extend radially inward in a downward direction from the inner surface of the upper portion of the cover portion;
   at least one adhesive layer fixed to an upper surface of the vibrating portion, and arranged in a circumferential direction below the elastic member; and at least one viscous body in a paste, the at least one viscous body being arranged in the circumferential direction on an upper surface of the at least one adhesive layer, arranged vertically opposite to the elastic member, and including an upper end portion arranged at a level higher than a level of the upper surface of the vibrating portion.

2. The vibration motor according to claim 1, wherein the upper surface of the at least one adhesive layer is arranged to be convex upward over an entire radial extent thereof; and
the at least one viscous body is arranged on an upper end portion of the upper surface of the at least one adhesive layer.

3. The vibration motor according to claim 1, wherein the at least one adhesive layer includes:
an adhesive lower portion including an upper surface arranged to extend perpendicularly to the central axis; and
a projecting portion arranged to project upward from the adhesive lower portion; and
the at least one viscous body is arranged on an upper end portion of the projecting portion.

4. The vibration motor according to claim 1, wherein the at least one adhesive layer includes:
an adhesive lower portion including an upper surface arranged to extend perpendicularly to the central axis; and
an outer projecting portion arranged to project upward from the adhesive lower portion; and
the at least one viscous body is arranged radially inside of the outer projecting portion and in contact with the outer projecting portion.

5. The vibration motor according to claim 1, wherein the at least one adhesive layer includes:
an adhesive lower portion including an upper surface arranged to extend perpendicularly to the central axis; and
an inner projecting portion arranged to project upward from the adhesive lower portion; and
the at least one viscous body is arranged radially outside of the inner projecting portion and in contact with the inner projecting portion.

6. The vibration motor according to claim 1, wherein the at least one adhesive layer includes:
an adhesive lower portion including an upper surface arranged to extend perpendicularly to the central axis; and
an outer projecting portion and an inner projecting portion each of which is arranged to project upward from the adhesive lower portion; and
the at least one viscous body is arranged radially between the outer projecting portion and the inner projecting portion and in contact with both the outer projecting portion and the inner projecting portion.

7. The vibration motor according to claim 1, wherein the at least one adhesive layer is annular; and
the at least one viscous body is annular.

8. The vibration motor according to claim 7, wherein the upper surface of the vibrating portion includes an annular recessed portion defined therein; and
the at least one adhesive layer is arranged on the annular recessed portion.

9. The vibration motor according to claim 1, wherein the at least one adhesive layer are arranged discontinuously in the circumferential direction; and
the at least one viscous body is arranged discontinuously in the circumferential direction.

10. The vibration motor according to claim 6, wherein the at least one adhesive layer is arranged discontinuously in the circumferential direction; and
the at least one viscous body is arranged discontinuously in the circumferential direction.

11. The vibration motor according to claim 9, wherein the upper surface of the vibrating portion includes a plurality of recessed portions discontinuous in the circumferential direction defined therein; and
the at least one adhesive layer is arranged on the plurality of recessed portions.

12. A mobile communication apparatus comprising the vibration motor of claim 1.

* * * * *